May 12, 1964 P. W. COLLYER 3,133,200
PHOTOSENSITIVE IMAGE DISPLACEMENT DETECTING SYSTEM
Filed Feb. 23, 1960 2 Sheets-Sheet 1

*INVENTOR.*
PHILIP WARDHAM COLLYER

BY Robert Ames Norton

*ATTORNEY*

May 12, 1964 P. W. COLLYER 3,133,200
PHOTOSENSITIVE IMAGE DISPLACEMENT DETECTING SYSTEM
Filed Feb. 23, 1960 2 Sheets-Sheet 2

*INVENTOR.*
PHILIP WARDHAM COLLYER

BY

*ATTORNEY*

3,133,200
PHOTOSENSITIVE IMAGE DISPLACEMENT DETECTING SYSTEM

Philip Wardham Collyer, Stamford, Conn., assignor to Barnes Engineering Company, Stamford, Conn., a corporation of Delaware
Filed Feb. 23, 1960, Ser. No. 10,129
6 Claims. (Cl. 250—216)

This invention relates to an instrument in which the motion of radiant objects or reflected or refracted beams from a source is transformed into an electrical signal.

In a number of instrument types the motion of an image in the instrument either from self-luminous external sources or a reflected or refracted beam from an internal source are important to many applications of modern technology. Examples of the instrument types are trackers in which the motion of a self-luminous body is involved, reflected image devices such as autocollimators or refracted beam image detecting instruments such as refractometers. In all of these cases optical radiations, that is to say radiations of wavelengths such that they obey optical laws, form images on detector systems the motion of which images produces varying electrical signals. It is with an improved image dissection and detector system that the present invention is concerened.

The measurement of moving images is not new and many instruments have been devised in which an image moves across a detector or detector arrays or is dissected by a mirror wedge, part of the beam being reflected to one detector and the other part to another. These devices have certain important drawbacks. When the image is caused to move across a detector or from one to another detector in an array the resulting electrical output signals measure not only the movement of the image but also any variation in detector sensitivity. In large detectors it is almost impossible to have uniform sensitivity for the whole surface of the detector and where separate detectors are used the sensitivity of the detectors will vary both initially and by different changes with time, ambient temperatures and other factors which enter into detector sensitivity. As a result the component of the electrical output signal caused by detector nonuniformity represents a spurious signal and gives a false measurement. In instruments of maximum sensitivity and precision this can be a very serious matter and even when less precise measurements can be tolerated it is an undesirable situation.

All of the types of instrument with which the present instrument is concerned produce a beam which is imaged onto a detector. Normally this involves an objective of some sort, either catoptric or dioptric. The present invention does not change the nature of the objective but is concerned only with the dissection of the image and detection of its motion. Instead of causing the image of the target to move across the detector or a pair of detectors in the present invention the image moves across the dividing line and images the entrance pupil of the system on one-half of a detector and the other on the other half. The images of the entrance pupil on the detector do not move but are always located on the same area or areas of the detector. Displacement of the target or other elements which form the image of the target results in more or less energy going to each detector but since the interposed field lenses image the whole of the entrance pupil on each detector half the area receiving energy remains the same and the displacement of the target only varies the relative energy in the two images. Since each image covers a fixed area of detector accurate calibration is possible.

Another important feature is that since they do not move, the images on the two detectors or detector portions permit very small detectors. This is of extreme importance in infrared instruments where for maximum sensitivity the optical radiation detectors such as photoconductors, for example, lead sulfide flakes for the near infrared, or thermistors for longer wavelength radiation should be made small for maximum sensitivity. Thus, for example, in a typical infrared detector such as lead sulfide or flake thermistor the detector can be a rectangle no larger than three millimeters by six divided into two halves.

In its broader aspects the present invention is not particularly concerned with the nature of the detectors or differential detector. In a more specific aspect of the invention, dealing with infrared instruments, there is also included a combination of the image dissecting field lenses and a particular type of differential detector of a photoconductive or thermistor type. This type of detector will be described in more detail in conjunction with the drawings and constitutes a preferred embodiment as it permits a maximum of stable operation.

In many instruments such as trackers, autocollimators and the like the radiation striking the objective of the system is collimated. However, the invention is in no sense limited thereto and with some instruments, for example, certain refractometers or certain electro-optical sensors for measurement of motion of near reflecting objects, the incoming radiation may be divergent or convergent. Of course, the field lenses must be positioned to form stationary images on the detectors for the particular beam conditions with which the instrument deals. The possibility of using radiation which is not collimated extends the field of utility of the present invention to such instruments as infrared spectrometers where the diffracted beam for particular wavelengths often is not collimated.

Since it is desirable to produce a clean, image dissection it is usually preferable to have the field lenses meet along a line as, for example, by grinding off a portion of each circular lens and preferably cementing the edges together. It is also possible to use field lens combinations in which a single homogeneous lens is provided with inclined rear faces. In every case there is present a sharp dividing line.

Ordinarily in instruments of the present invention the wavelength band used or the required precision of the imaging is sufficiently small so that fixed field lenses may be used. Adjustable field lenses which can be adjusted for particular radiation wavelength bends are, of course, also included.

Usually the field lenses can be located where a great dioptric power is not needed or desired. This is an advantage as simple lenses may be used without encountering aberration problems. On the other hand, in some cases the thin lenses may be fragile and in such instances they may be mounted on a transparent backing such as a glass or other transparent plate.

The invention will be described in greater detail in conjunction with the drawings in which.

Figure 1:
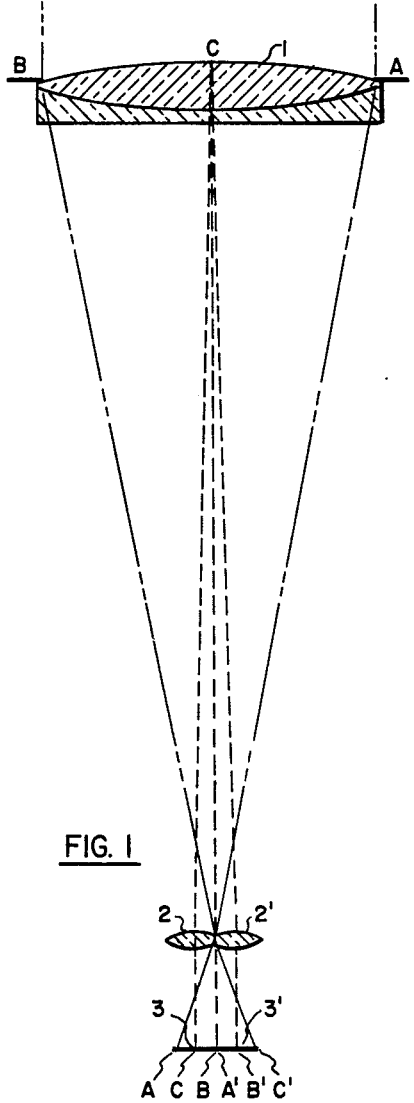
FIG. 1 is a diagrammatic cross section through an instrument showing the optics.

Throughout the drawings left and right paired elements will be given the same reference numeral with the right-hand element primed. Also in the figures showing the diagrams including an objective, points on the objective will be designated by capital letters and corresponding points on the detector plane by small letters, again as in the case of reference numerals lettered points on paired elements will be primed on the right hand element.

Figure 2:
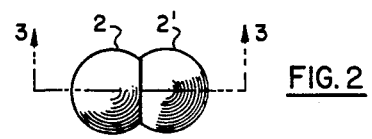
FIG. 2 is a plan view of a pair of field lenses.
Figure 3:
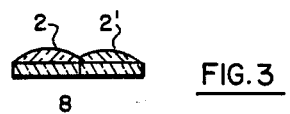
FIG. 3 is a cross section along the line 3—3 of FIG. 2.

In FIG. 1 a typical objective is shown as a cemented doublet 1. The right hand edge is designated A, the left hand edge B and the center C. The objective constitutes the entrance pupil of the system which is the opening which determines the cross section of the light beam which the instrument is using and is shown as illuminated by collimated radiation. In the focal plane of the objective there is located a pair of field lenses 2 and 2'. FIGS. 2 and 3 show a modified pair of lenses mounted on a backing plate 8.

The beam passing through the field lenses then forms an image or images of the objective lens on detector portions 3 and 3'. The dashed lines from C to c and c' indicate the optical centers of the field lenses and the images on the detector. As usual the images of the objective are reversed on the two detector halves.

Figure 4:
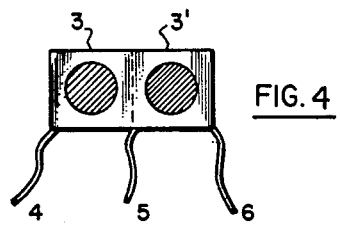
FIG. 4 is a plan view of a preferred type of infrared detector.

FIG. 4 shows a preferred detector consisting of a single flake of photoconductive or thermistor material. This flake may, for example, be of the order of 3 x 6 mm. Three leads are welded or otherwise attached to the detector flake, a left-hand lead 4, a right-hand lead 6 and a center lead 5 which is welded or otherwise attached across the whole of the center of the flake. These leads extend to a conventional bridge circuit with a conventional bias supply. As the bridge circuit and other electronic processing per se forms no part of the present invention it is not shown. Putting it another way the present invention ceases once an electrical signal has been produced and this may then be processed to give meter readings, recordings, actuate servo systems and the like. It is an advantage of the present invention that it utilizes conventional electronics which require no modification of any kind to be applicable.

In operation let us consider FIG. 1 as part of a telescope or autocollimator. In each case a collimated beam from a target, self-luminous in the case of a telescope or the reflection of a light source from the movable reflecting element in an autocollimator, strikes the objective and after passing through the field lenses appears as two images of equal size on the detector (see FIG. 4). If the target beam is centered then the intensity of the two images on the two halves of the detector will be identical and no differential electrical signal will result or if there should be a slight difference in sensitivity of the two halves of the detector, a condition which is enormously minimized by using a single flake detector which is of maximum uniformity, the bridge circuit can be adjusted to read zero by conventional bridge adjusting elements.

It should be noticed that it is in no sense necessary that the target image be a point image. In each case the size of the images on the detector produced by the field lenses are going to be the same. If now the target moves then while the two images on the detector do not move their relative intensity will change and so there will be produced a differential electrical signal which is a measure of the motion of the image in the image dissecting plane of the field lenses.

The use of a single, small flake of detector material, such as lead sulfide or a thermistor, not only results in maximum initial uniformity but there will be no substantial change in relative detector sensitivity with changing environmental conditions either time, ambient temperature or intensity of radiation. For this reason a single small detector flake constitutes the preferred form of detector for the present invention. It should be understood that the invention is not limited to the use of such a detector and two detectors such as two photo tubes and the like may be used. However, the single flake presents such great advantages in the infrared, permitting encapsulation into a small unit of maximum stability of such characteristics that the preferred detector will normally be used when the operating conditions of the instrument permit such a type of detector.

Theoretically for most perfect imaging the field lenses 2 and 2' should be slightly inclined to each other. However, the lens power is small and the error introduced having the lenses in the same plane is negligible for most applications so that it is not necessary to use the added refinement of inclined lenses.

As has been pointed out before the nature of the instrument objective is not of significance in the present invention. As a dioptric objective makes for the simplest showing of rays this is illustrated in FIG. 1. Of course, the objective can be catoptric and in infrared work this is often preferable because of the cheap and light-weight construction for very large apertures and its achromaticity when used over a wide wavelength band. It is an advantage of the present invention that it is not limited to any particular type of objective.

Figure 5:
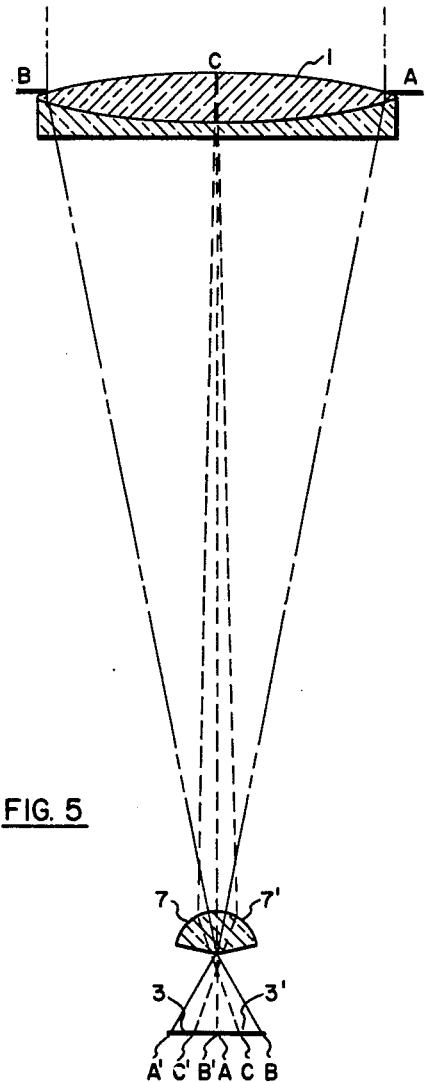
FIG. 5 is a diagrammatic view of an instrument with a modified form of field lenses.
Figure 6:
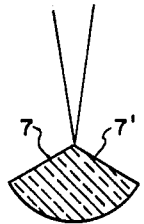
FIG. 6 is a view of an alternate way of mounting the form of field lens shown in FIG. 5.

FIGS. 5 and 6 illustrate a modification, the same elements bearing the same numbers as in FIG. 1. Again for simplicity of ray tracing a dioptric objective is shown. Instead of a pair of field lenses cemented along a line as shown in FIG. 1 a single lens having inclined faces 7 and 7' is used. The operation of the device is the same as in FIGS. 1 to 4 and the same advantages are obtained.

It has been stated above that the present invention does not require that the objective of the instrument be illuminated with collimated light. If the divergent or convergent light is used the positioning of the field lenses and detector may require suitable change.

Figure 7:
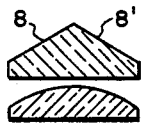
FIG. 7 illustrates a separated image dissector and field lens.

FIG. 7 shows image separation function and aperture imaging function separated into two components. Image separation is effected by a prism with faces 8 and 8' before passing through a single field lens 9. The elements may be reversed individually or in relative position.

I claim:

1. A moving image measurement device comprising in combination and in optical alignment,
   (a) an entrance pupil,
   (b) means for producing an image of a desired target in a plane,
   (c) multiple detectors for optical radiation and means, located in the target image plane, for splitting the target image along a central dividing line at right angles to and substantially crossing the optic axis of the instrument, and for producing two images of the entrance pupil, one on one detector and one on the other.

2. A device according to claim 1 in which the means for splitting the image and for producing two images are a pair of field lenses connected along a central dividing line.

3. A device according to claim 1 in which the means for splitting the image and producing two images comprises a prismatic element having an edge along the central dividing line and a field lens element.

4. A device according to claim 3 in which the prismatic element and field lens are a single unitary element.

5. A device according to claim 1 in which the detectors are a single flat piece of radiation responsive material having electrical leads connected to the ends and center thereof.

6. A device according to claim 2 in which the detectors are a single flat piece of radiation responsive material having electrical leads connected to the ends and center thereof.

References Cited in the file of this patent

UNITED STATES PATENTS

| | | |
|---|---|---|
| 1,778,754 | Cox | Oct. 21, 1930 |
| 1,843,642 | Kienast | Feb. 2, 1932 |
| 1,970,678 | Waide | Aug. 21, 1934 |
| 2,016,036 | Fitzgerald | Oct. 1, 1935 |
| 2,157,099 | Rosenhauer | May 9, 1939 |
| 2,200,467 | Cristiani | May 14, 1940 |
| 2,267,952 | Sauer | Dec. 30, 1941 |
| 2,831,981 | Watts | Apr. 22, 1958 |
| 2,894,427 | Alvarez Sabater | July 14, 1959 |
| 2,960,908 | Willits et al. | Nov. 22, 1960 |